US006997437B2

(12) United States Patent
Mitten

(10) Patent No.: US 6,997,437 B2
(45) Date of Patent: Feb. 14, 2006

(54) VALVE FOR DYNAMIC CONTROL OF FUEL FLOW RATE IN GAS TURBINE POWER PLANT, POWER PLANT AND COMPONENTS THEREOF EMPLOYING SUCH VALVE, AND METHOD OF CONSTRUCTING SUCH VALVE

(76) Inventor: John Mitten, 4372 Watervale Rd., Manlius, NY (US) 13104

( * ) Notice: Subject to any disclaimer, the term of this patent is extended or adjusted under 35 U.S.C. 154(b) by 116 days.

(21) Appl. No.: 10/669,935

(22) Filed: Sep. 24, 2003

(65) Prior Publication Data

US 2004/0129000 A1 Jul. 8, 2004

Related U.S. Application Data

(60) Provisional application No. 60/438,473, filed on Jan. 7, 2003.

(51) Int. Cl.
*F02C 7/22* (2006.01)
(52) U.S. Cl. .................. 251/214; 251/267; 251/274; 60/734
(58) Field of Classification Search .................. 251/83, 251/266–278, 214; 60/734

See application file for complete search history.

(56) References Cited

U.S. PATENT DOCUMENTS

| | | | | |
|---|---|---|---|---|
| 2,657,005 A | * | 10/1953 | Van Nest | 251/269 |
| 4,087,075 A | * | 5/1978 | Nechanicky | 251/214 |
| 4,394,023 A | | 7/1983 | Hinojosa | |
| 5,056,759 A | * | 10/1991 | Schlesch | 251/330 |
| 5,373,692 A | | 12/1994 | Correa | |
| 6,370,864 B1 | | 4/2002 | Murphy | |

\* cited by examiner

*Primary Examiner*—Justine R. Yu
*Assistant Examiner*—Peter deVore
(74) *Attorney, Agent, or Firm*—Burr & Brown

(57) ABSTRACT

There is disclosed a valve comprising a valve stem threaded with a translator having a flow modulating region, in which rotation of the valve stem about its axis causes the translator to move axially relative to the valve stem. In one aspect, the threads on the translator and the valve stem threads have substantially similar coefficients of thermal expansion. In another aspect, a protrusion limits axial movement of the valve stem in one direction, the valve stem has at least one protuberance, at least one gland is engaged with the valve body, and at least one shim is positioned between the protuberance and the gland so as to limit axial movement of the valve stem relative to the valve body in an opposite direction. There are also disclosed power generating systems including such valves, and methods of constructing such valves.

45 Claims, 8 Drawing Sheets

FLOW →

VALVE FOR DYNAMIC CONTROL OF FUEL FLOW RATE IN GAS TURBINE POWER PLANT, POWER PLANT AND COMPONENTS THEREOF EMPLOYING SUCH VALVE, AND METHOD OF CONSTRUCTING SUCH VALVE

CROSS-REFERENCE TO RELATED APPLICATIONS

This application claims the benefit of U.S. Provisional Patent Application No. 60/438,473, filed Jan. 7, 2003, the entirety of which is incorporated herein by reference.

FIELD OF THE INVENTION

The present invention relates to gas turbine power plants and components thereof, in particular, to valves for dynamic control of fuel flow rates in gas turbine power plants, as well as power plants and components thereof which incorporate such valves. The present invention also relates to methods of making such valves.

BACKGROUND OF THE INVENTION

A variety of gas turbine power plant designs have been employed in the past. In a representative example, fuel, e.g., natural gas, is fed from a fuel supply into a plurality of fuel manifolds, each fuel manifold communicating with a plurality of fuel lines, each of the fuel lines in turn communicating with a respective combustion canister. The combustion canisters are arranged relative to the turbine such that exhaust from burning the fuel drives the turbine, in a manner which is abundantly well known in the art.

Valves have been employed to control the rate of flow of fuel into each of the combustion canisters, e.g., by providing a valve in each fuel line connecting a combustion canister to a fuel manifold. By providing such valves, it has been possible to provide different flow resistances in different fuel lines, e.g., to make it possible to adjust the fuel in each of the combustion canisters, e.g., such that fuel flow to each combustion canister may be maintained at values which are the same as or substantially the same as those in the other combustion canisters. For example, even in cases where different fuel lines are connected to a fuel manifold at locations which are different distances from a fuel inlet connecting the fuel supply to the fuel manifold and/or through flow paths of differing geometries, uniform fuel/air mixtures can be provided to each of the combustion canisters by adjusting the respective valves (for example, by creating greater valve flow resistance in fuel lines which are closer to the fuel inlet and/or which are connected through a flow path geometry having lower resistance).

One valve design which has been particularly useful in such a gas turbine power plant system is depicted in FIG. 1. Referring to FIG. 1, the valve includes a valve body and a bonnet, the valve body including a valve stem and a translator. The valve body includes a bonnet receiving region in which at least a portion of the bonnet is positioned, and a flow channel 100.

The valve is connected in a well known manner to a flanged inlet pipe (not shown) on one side of the valve and a flanged outlet pipe (not shown) on the other side of the pipe by connecting a first circumferential flange 101 on the valve body to a circumferentially flanged inlet pipe such that a conduit defined by the inlet pipe communicates with the flow channel 100, and connecting a second circumferential flange 102 on the valve body to a circumferentially flanged outlet pipe such that a conduit defined by the outlet pipe also communicates with the flow channel 100. Accordingly, the conduit defined by the inlet pipe communicates with the conduit defined by the outlet pipe through the flow channel 100 which passes through the valve.

The valve stem includes a cranking portion 110, a cylindrical portion 111 and a bell-shaped portion 112. The translator includes a translator stem portion 113 and a flow regulating portion 114. The translator stem portion 113 has external threads which engage internal threads on a threaded insert 115 which is welded to the inside of the bell-shaped portion 112.

The cranking portion 110 of the valve stem can readily be engaged with a manual cranking tool in order to rotate the valve stem about its axis (i.e., the valve stem rotates axially without moving translationally), thereby causing the translator to move in a direction along the axis of the valve stem by virtue of the threading of the external threads of the translator stem portion 113 on the internal threads of the threaded insert 115. As a result of such motion, the flow regulating portion 114 of the translator moves relative to the flow channel 100 between a position (see FIG. 2) where the flow regulating portion 114 is in contact with the bottom (in the orientation shown in FIG. 2) surface of the flow channel 100, i.e., the surface which is opposite to the valve stem (maximum flow obstruction) and a position where the flow regulating portion 114 is retracted (upward in the orientation shown in FIG. 2) out of the flow channel 100 (minimum flow obstruction).

Such a valve stem is referred to herein as a "non-rising" valve stem, because operation of the valve can be achieved without the valve stem rising or falling within the valve body (rising or falling referring to moving upward or downward in the perspective depicted in FIG. 1). That is, the valve can be operated by rotating the valve stem about its axis without moving the valve stem translationally.

Such a valve has been effective as a flow control valve in which the position of the translator can be set by rotation of the valve stem to provide a desired flow resistance, and the translator remains in that position for the duration of the useful life of the valve. As such, a plurality of such valves can be manufactured, and then each of the valves can be set at a different flow resistance to provide the varying flow resistances required of a set of valves in the fuel lines extending from different positions along a fuel manifold. Such valves are sometimes referred to as "set and forget" valves.

Despite such valves and the myriad systems in practice, there is an ongoing need for systems which generate power more efficiently, more safely and with fewer environmental side effects (e.g., lower emission levels and/or less hazardous emissions).

SUMMARY OF THE INVENTION

In order to provide systems which generate power more efficiently, more safely and with fewer environmental side effects, in accordance with the present invention, there is provided an improved valve for dynamically controlling fuel flow into each of the combustion canisters, in order to be able to intermittently or substantially continuously tune the system (e.g., a gas turbine power plant). For example, the valves can be dynamically controlled based on any desired feedback controls, e.g., measuring specific operating parameters, comparing such measurements with desired values or other measured values and making appropriate adjustments to the fuel flow rates by adjusting the respective positions of the flow modulating regions of one or more valves. Providing the ability to dynamically control fuel flow into each combustion canister separately makes it possible to balance fuel flow to each combustion canister and/or to tune one or more aspect of the system, for example, to control one or more parameters (e.g., temperature) within the system (e.g., to make it uniform or to make it follow a desired profile), and/or to eliminate one or more dynamic phenomena (e.g., vibration within the system). Such dynamic control of fuel flow into each combustion canister makes it possible to re-tune the system as necessary, e.g., when operating conditions change over time.

However, providing dynamic control valves for use in providing long-term control, especially substantially continuous control, raises a spectrum of engineering concerns in comparison with "set and forget" valves.

For example, in a dynamic control valve which employs a "non-rising" valve stem, it is necessary to avoid a situation where the connection between the valve stem and the translator seizes, making control of the valve impossible. Typically, in known "set and forget" valves, after setting the translator to a desired position and operating a system which incorporates the valve for a period of time, the threading between the threaded insert and the translator seizes, making movement of the threaded insert relative to the translator difficult or impossible. In accordance with one aspect of the present invention, it has been determined that this seizing is typically caused at least in part by the various temperature conditions to which the valve, including the threaded insert and the translator, is subjected, and the respective differing rates of thermal expansion of the threaded insert and the translator. In a dynamic control valve, the magnitude of such thermal variations is increased by the repeated (sometimes substantially continuous) threading action needed to position the translator by rotation of the valve stem, creating heat by the friction between the respective threaded structures.

Another need which has arisen in connection with the desire to provide a dynamic control valve in fuel lines in a gas turbine power plant is the need to be able to closely adjust the tightness of the seal between the valve stem and the valve body, and to be able to accurately maintain the tightness of that seal. Such an ability is particularly important in the case of a system in which the valve(s) is/are repeatedly (and in some cases substantially continuously) adjusted to maintain system performance at optimum conditions (e.g., with feedback controls), because movement of the valve stem to adjust the valve generates heat due to the friction between the valve stem and the seal (e.g., packing). The tighter the seal, and the greater the frequency of movement of the valve stem, the more heat is generated, such heat (particularly over extended periods of time) having a tendency to reduce the useful life of the valve.

A further need which has arisen is the desire to minimize vibration of the valve stem within the valve body, regardless of the exact instantaneous position of the valve stem within the valve, and regardless of the setting of the tightness of the seal between the valve stem and the valve body.

In accordance with one aspect of the present invention, there is provided a valve comprising:
  a valve body having a bonnet receiving region and at least one flow channel; and
  a bonnet comprising a valve stem and a translator, at least a portion of the bonnet being positioned within the bonnet receiving region, the valve stem having a valve stem axis and being rotatable about the valve stem axis, the valve stem having valve stem threads on a valve stem threaded region,
  the translator having translator threads on a translator threaded region,
  the valve stem threads being threaded on the translator threads so that the translator can be moved from a first position to a second position by clockwise rotation of the valve stem about the valve stem axis, and the translator can be moved from the second position to the first position by counter-clockwise rotation of the valve stem about the valve stem axis, the first position being spaced from the second position in a translator motion direction which is co-linear with or substantially co-linear with the valve stem axis, at least a portion of the translator protruding into the flow channel when the translator is in at least one of the first position and the second position,
  whereby the translator can be positioned at a translator position selected from among the first position, the second position, or positions along the translator motion direction between the first position and the second position, such that flow through the flow channel is affected by the translator position,
  at least the translator threads having a coefficient of thermal expansion which is substantially similar to a coefficient of thermal expansion of the valve stem threads.

By providing such a valve, in which the translator threads have a coefficient of thermal expansion which is substantially similar to a coefficient of thermal expansion of the valve stem threads, the tendency for the translator threads and the valve stem threads to seize over time is reduced or eliminated, even where the translator threads and the valve stem threads are subjected to wide temperature variation.

Preferably, at least the translator threads and the valve stem threads are formed of the same material. More preferably, substantially the entire translator and substantially the entire valve stem are formed of the same material.

In accordance with another aspect of the present invention, there is provided a valve comprising:
  a valve body having a bonnet receiving region and at least one flow channel;
  a bonnet comprising a valve stem and a translator, at least a portion of the bonnet being positioned within the bonnet receiving region, the valve stem having a valve stem axis and being rotatable about the valve stem axis, the valve stem having at least one protuberance extending radially outward from the valve stem;
  at least one protrusion being provided on one of the valve stem and the valve body, which protrusion engages the other of the valve stem and the valve body so as to limit axial movement of the valve stem relative to the valve body in a first direction along the valve stem axis;
  at least one gland engaged with the valve body, the gland being positioned radially outward from a portion of the valve stem; and
  at least one shim positioned radially between the valve stem and the valve body, and axially between the protuberance and the gland, so as to limit axial movement of the valve stem relative to the valve body in a second direction, opposite to the first direction,
  the valve stem having valve stem threads on a valve stem threaded region,
  the translator having translator threads on a translator threaded region,
  the valve stem threads being threaded on the translator threads so that the translator can be moved from a first position to a second position by clockwise rotation of the valve stem about the valve stem axis, and the translator can be moved from the second position to the first position by counter-clockwise rotation of the valve stem about the valve stem axis, the first position being spaced from the second position in a translator motion direction which is co-linear with or substantially co-linear with the valve stem axis, at least a portion of the translator protruding into the flow channel when the translator is in at least one of the first position and the second position, whereby the translator can be positioned at a translator position selected from among the first position, the second position, or positions along the translator motion direction between the first position and the second position, such that flow through the flow channel is affected by the translator position.

By providing such a valve, which comprises at least one protrusion which limits axial movement of the valve stem in a first direction, at least one gland positioned radially outward from the valve stem, a protuberance and at least one shim positioned axially between the protuberance and the gland, vibration of the valve stem within the valve body can be minimized regardless of the exact instantaneous position of the valve stem within the valve body, because the valve stem is limited from axial movement in one direction by the engagement of the protuberance with the shim(s), and in the opposite direction by the protrusion(s) which provides engagement of the valve stem and the valve body. In addition, by providing such a valve, which further comprises a seal between the valve body and the valve stem, and in which the gland has a seal contact surface which abuts the seal, the tightness of the seal can be closely adjusted by axially positioning the gland, and such tightness can be accurately maintained by the shim(s) (which is/are held in place axially by the protuberance), thereby preventing the gland from moving axially. In addition, such a valve makes it possible to minimize vibration of the valve stem within the valve body, regardless of the setting of the tightness of the seal between the valve stem and the valve body.

Preferably, the gland has external gland threads which are threaded on internal gland threads on the valve body such that the gland can be selectively rotated clockwise or counter-clockwise relative to the valve stem axis to cause the gland to be moved axially relative to the valve stem axis.

The present invention is further directed to a method of making a valve, comprising inserting one or more shims between a protuberance and a gland as described above.

The present invention is also directed to a power generating system, comprising:
  at least one turbine; and
  at least one combustion system, the combustion system comprising:
    at least one fuel supply;
    at least one combustion canister;
    at least one valve as described above; and
    at least one fuel conduit communicating between the fuel supply and the combustion canister through one or more flow channel(s) in the valve.

The present invention may be more fully understood with reference to the accompanying drawings and the following detailed description of the invention.

BRIEF DESCRIPTION OF THE DRAWING FIGURES

DETAILED DESCRIPTION OF THE INVENTION

Figure 1:
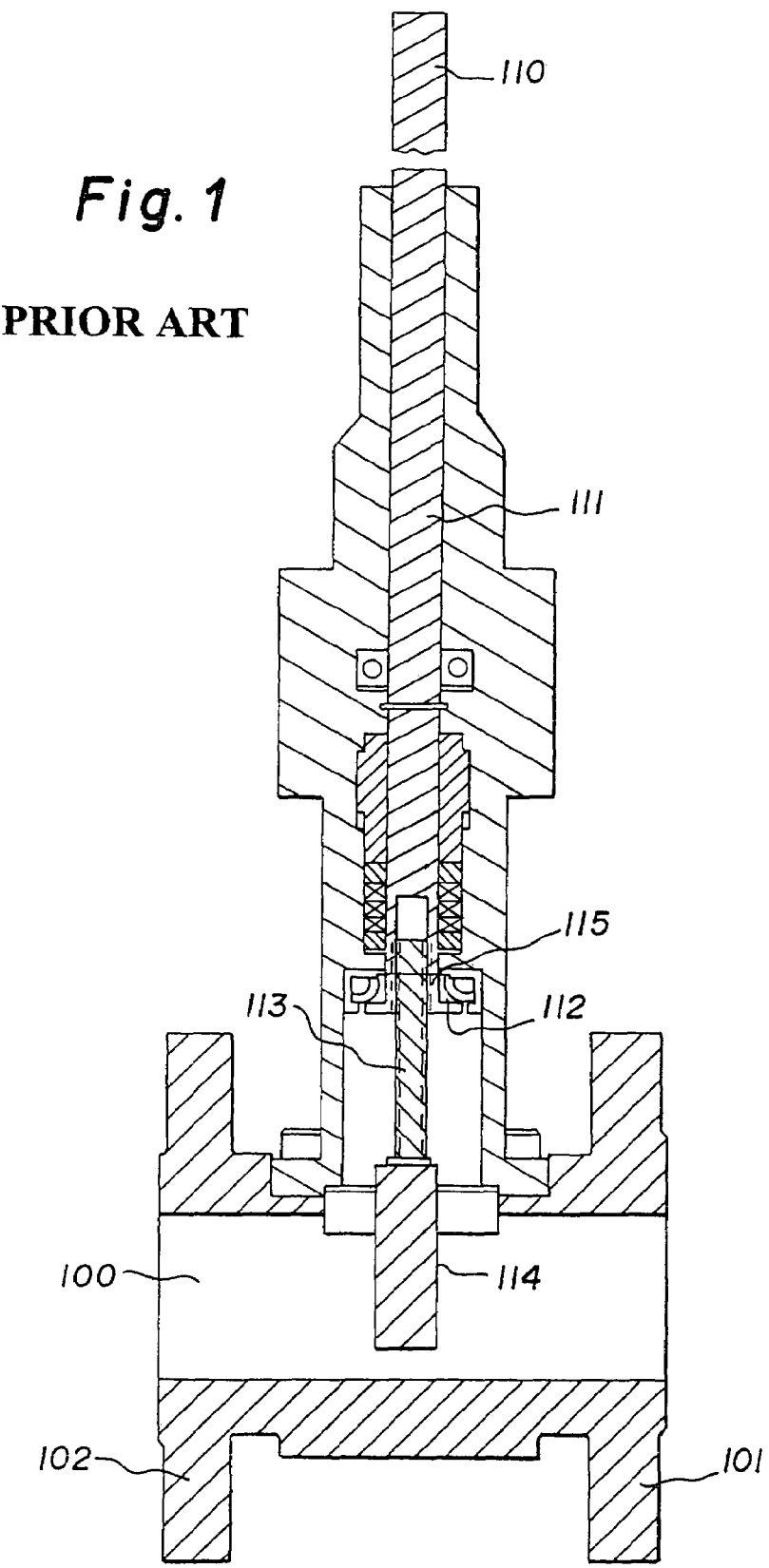
FIG. 1 is a sectional view of a valve which has been used in gas turbine power plant systems.
Figure 2:
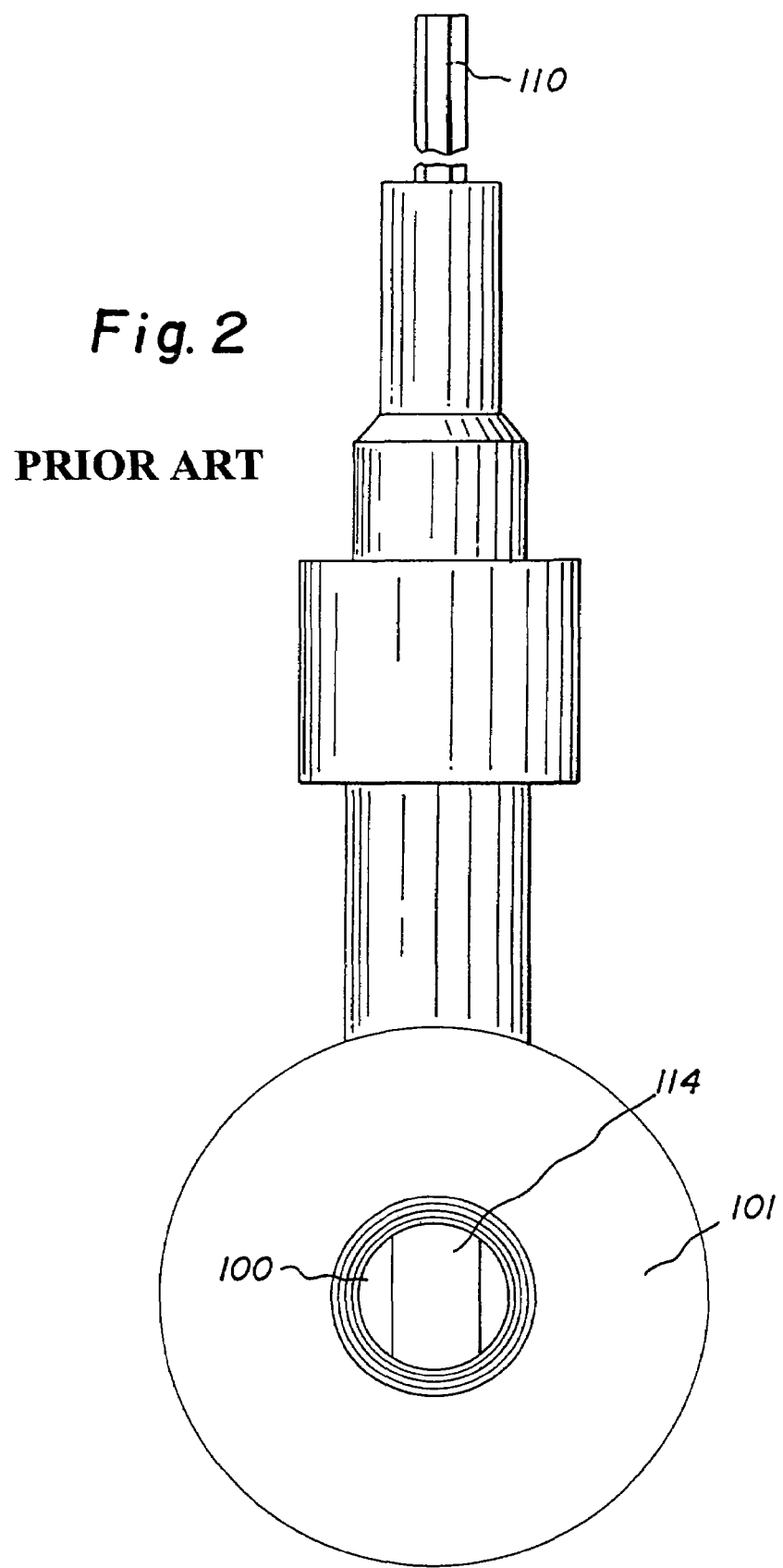
FIG. 2 is a front view of the valve depicted in FIG. 1.

As noted above, the present invention is directed to a valve comprising a valve body and a bonnet. The valve body has a bonnet receiving region and at least one flow channel. At least a portion of the bonnet is positioned within the bonnet receiving region. Fluid passing through the valve passes through the flow channel from a flow channel inlet to a flow channel outlet.

The valve body can be generally of any shape which includes a bonnet receiving region which can receive at least a portion of the bonnet and which includes at least one flow channel through which fluid passing through the valve can flow. The valve body can be made of any suitable material or materials, such material(s) preferably being substantially impervious to any fluids with which the valve would be expected to come into contact in use, for example, fluids such as air and rain water which might come into contact with the exterior of the valve, as well as fuel and/or fuel-air mixtures which might be supplied to the flow channel inlet for passage through the valve. In addition, the material of the valve body must be capable of withstanding the conditions to which it will be subjected during use, e.g., high temperatures and pressures, vibration, and any other forces that may impact the valve body. For example, suitable materials out of which the valve body can be constructed include metals. A preferred example of a suitable material out of which the valve body can be constructed is stainless steel.

As mentioned above, the bonnet of the valve according to the present invention comprises a valve stem and a translator. The valve stem has a valve stem axis about which the valve stem is rotatable. The valve stem is a "non-rising" valve stem. Preferably, the valve stem is substantially prevented from moving relative to the valve body, except for such rotation of the valve stem about its axis.

The valve stem preferably comprises a cranking portion which extends outside of the valve body and which preferably has an axis which is co-linear with the valve stem axis, the cranking portion of the valve stem having an exterior geometry, e.g., a protrusion with a hexagonal cross-section, which can readily be engaged, e.g., by a tool or mechanical gear box in order to cause rotation of the valve stem about the valve stem axis.

The valve stem has a valve stem threaded region on which valve stem threads are provided. Such valve stem threads can be provided on an internal surface (i.e., female threads) or on an external surface (i.e., male threads).

The valve stem can be formed of any suitable material or materials. For example, suitable materials out of which the valve stem can be constructed include metals. A preferred example of a suitable material out of which the valve stem can be constructed is stainless steel.

The translator has a translator threaded region having translator threads which are threaded on the valve stem threads. Where the valve stem threads are provided externally on the valve stem (i.e., male threading), the translator threads are provided internally on the translator (i.e., female threading); where the valve stem threads are provided internally on the valve stem (i.e., female threading), the translator threads are provided externally on the translator (i.e., male threading). The translator is prevented from rotating about its axis by any suitable structure. For example, a suitable structure for preventing the translator from rotating is a guide having a guide shoulder which defines a guide opening through the guide and which surrounds a guide engaging portion of the translator, the guide opening having a non-cylindrical shape, the guide engaging portion of the translator having a corresponding non-cylindrical shape.

Figure 3:
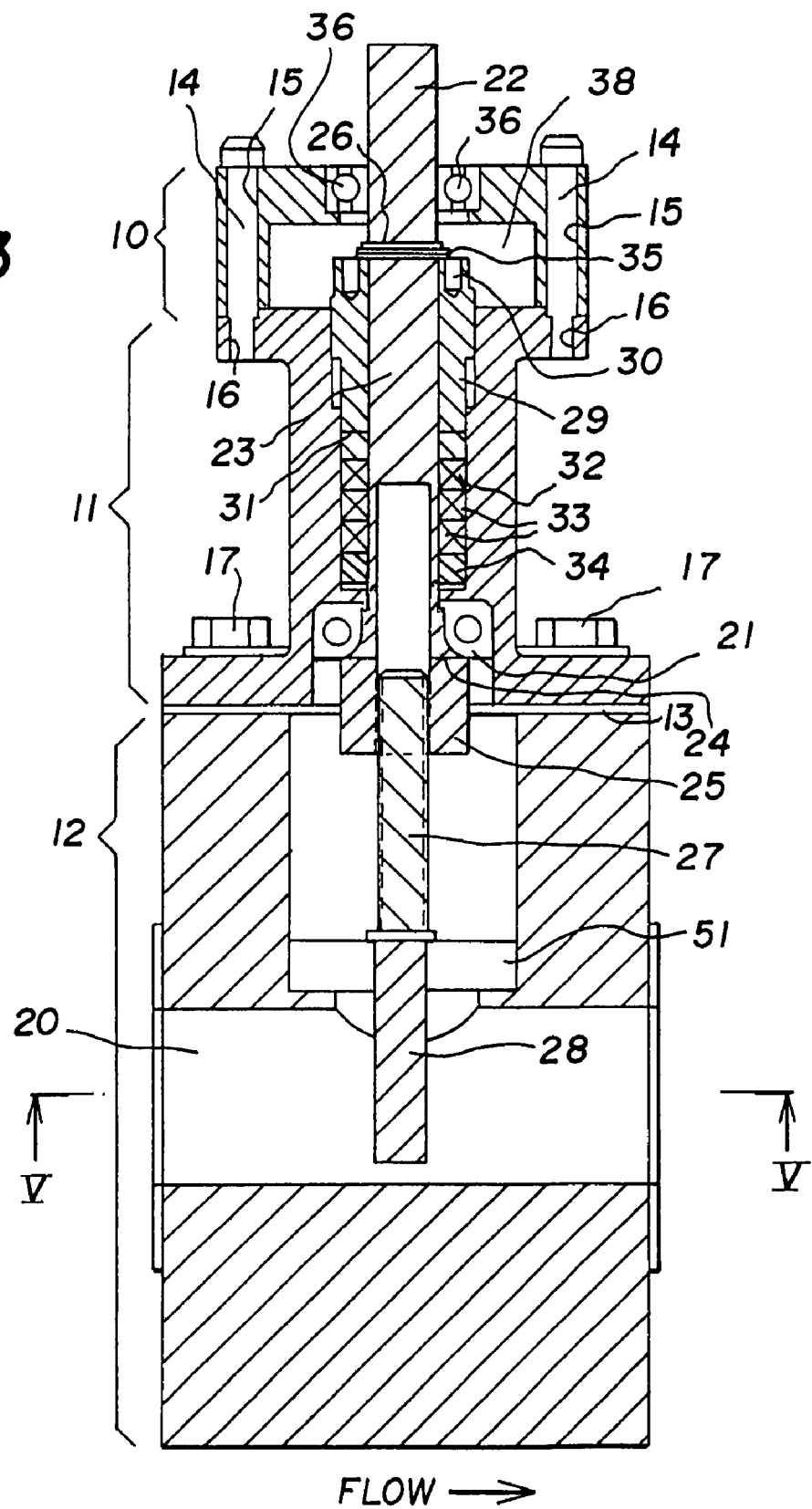
FIG. 3 is sectional view of an example of a preferred embodiment according to the present invention.

Accordingly, and from the perspective shown in FIG. 3, when the valve stem is rotated about the valve stem axis in a first direction (i.e., looking down from the perspective shown in FIG. 3, clockwise or counter-clockwise), by virtue of the threading of the valve stem threads on the translator threads, the translator moves upward, and when the valve stem is rotated about its axis in the opposite direction, the translator is moved downward. When the translator is in its lowermost (from the perspective shown in FIG. 3) position, a portion of the translator is positioned in the flow path of fluid passing through the flow channel from the flow channel inlet to the flow channel outlet, such that the flow of such fluid is impeded to some extent, whereby the flow rate of said fluid through the flow channel is decreased by virtue of the impedance created by the portion of the translator in the flow path of the fluid traveling through the flow channel.

The translator can have any suitable shape, so long as it includes the translator threads, and so long as at least part of the translator extends into the path of the flow channel when the translator is at its lowermost position from the perspective depicted in FIG. 3. Preferably, the translator includes a translator stem portion and a flow modulating region, the translator stem portion and the flow modulating region being welded together, the translator threads being formed on the translator stem portion, and at least a portion of the flow modulating region being in the path of flow through the flow channel when the translator is in its lowermost position (in the perspective depicted in FIG. 3).

The translator can be made of any suitable material or materials. For example, suitable materials out of which the translator can be constructed include metals. A preferred example of a suitable material out of which the translator can be constructed is stainless steel.

As mentioned above, the valve of the present invention can repeatedly be manually or automatically adjusted to affect the flow rate of fluid through the flow channel, throughout the useful life of the valve and under a variety of conditions (e.g., varying temperature and pressure conditions), more reliably than known "set and forget" valves. In accordance with a preferred aspect of the present invention, the translator threads have a coefficient of thermal expansion which is substantially similar to a coefficient of thermal expansion of the valve stem threads. By providing such a thermal expansion match (or substantial match), the relative positioning of the various surfaces of the valve stem threads with respect to the surfaces of the translator threads is more closely maintained during changes in conditions (e.g., a power plant operating at full capacity versus a power plant which is temporarily shut down), whereby the respective threaded services can be readily moved relative to one another over a wide range of conditions. By providing such thermal expansion matching (or substantial matching), the tendency of the translator threads and the valve stem threads to seize is reduced.

More preferably, the translator threads and the valve stem threads are formed of the same material. Even more preferably, the entire translator and the entire valve stem are both formed of the same material.

Preferably, an anti-galling material is applied to the respective threads in order to further reduce the possibility of seizing. For example, a suitable anti-galling material is marketed by Loctite under the name "HD Anti-seize (51605)."

Preferably, the protrusion comprises at least one shoulder portion which extends radially from the valve stem axis farther than an adjacent portion of the valve stem, and the valve stem is limited from moving upward (in the perspective shown in FIG. 3) along the valve stem axis by the shoulder portion engaging a corresponding shoulder receiving portion of the valve body. The expression "radially," as used herein, refers to relative distance from an axis, e.g., the valve stem axis (e.g., structure which is radially between the valve stem and the valve body indicates that the distance from the valve stem axis to the structure is greater than the distance from the valve stem axis to the outer surface of the valve stem, and less than the distance from the valve stem to the inner surface of the valve body) "radially" does not indicate that the structure being described is of any particular shape.

The valve preferably comprises a seal which prevents or inhibits fluid from the flow channel from escaping between the bonnet and the valve body. A preferred example of such a seal comprises first and second annular members positioned substantially coaxially with the valve stem and radially between the valve stem and the valve body, and packing positioned axially between the first and second annular members and radially between the valve stem and the valve body.

Each of the annular members can be made of any surface material or materials. For example, suitable materials out of which the annular members can be constructed include metals. A preferred example of a suitable material out of which the annular members can be constructed is brass.

The packing can be made of any suitable material or materials. A number of suitable packing materials are well known to those of skill in the art. A preferred example of a suitable material out of which the packing can be formed is a graphite composite, e.g., a graphite paste marketed by Graftech Inc. under the trademark "GRAFOIL®".

As discussed above, another important aspect of the present invention is the provision of a valve which does not exhibit significant vibration even when it is deployed in a system which experiences large forces, e.g., the combustion dynamics in a cannular gas turbine combustor power plant system. A further important aspect of the present invention is the provision of a valve which does not exhibit significant vibration even when a system in which it is deployed is shut down and re-started, and even in the event that such cycling occurs repeatedly. For example, a need frequently arises to shut down a gas turbine power plant. According to this aspect of the present invention, there is provided a valve which exhibits such resistance to vibration and in which the degree of resistance to flow through the flow channel can readily be manually or automatically modified regularly or, if necessary, substantially continuously.

In a preferred aspect of the present invention, at least one protuberance is provided on the valve stem, the protuberance serving to limit the axial movement of the valve stem relative to the valve body such that the valve stem is limited in its movement along its axis in a first direction by the protuberance and in a second direction, opposite to the first direction, by the protrusion. For example, in the embodiment shown in FIG. 3, as discussed below, the valve stem is limited in its movement upward (in the perspective shown in FIG. 3) by a shoulder on the valve stem (which abuts a shoulder receiving portion on the valve body), and is limited in its movement downward (in the perspective shown in FIG. 3) by a protuberance on the valve stem which abuts a gland which is engaged with the valve body.

In a further preferred aspect of the present invention, at least one gland is provided, the gland being engaged with the valve body and being positioned radially outward from the valve stem, and at least one shim positioned radially between the valve stem and the valve body, and axially between the protuberance and the gland. In accordance with the present invention, the axial dimension (i.e., the dimension in the direction of the valve stem axis) of the (or each of the) shim(s) can be selected such that the extent to which the valve stem can move translationally (in the direction of the valve stem axis) relative to the valve body (i.e, other than rotation of the valve stem about its axis) can be minimized or substantially eliminated. Preferably, the valve stem includes outer surface regions which fit snugly within one or more of the valve body and within the gland (and the gland fits snugly within the valve body). Where the valve includes first and second annular members and packing, the valve stem preferably includes outer surface regions which fit snugly within the first and second annular members and the packing, and the first and second annular members and the packing preferably fit snugly within the valve body. Accordingly, the valve stem is securely held in place relative to the valve body, thereby minimizing or substantially eliminating vibration of the valve stem resulting from various forces acting on the overall system.

In a preferred aspect of the present invention, the gland is substantially annular and coaxial with the valve stem, and the gland is threaded to the valve body. The gland preferably has a seal contact surface at one axial end and a gland cranking structure at the opposite axial end. The gland cranking structure can be any structure which can be readily engaged with a manual or automatic tool for rotating the gland about its axis in either direction, i.e., clockwise (e.g., looking down from the perspective shown in FIG. 3) so as to move the gland in one direction toward or away from the seal, or counter-clockwise (e.g., looking down from the perspective shown in FIG. 3) so as to move the gland in the opposite direction. When the gland cranking structure is cranked in the direction such that the gland moves toward the seal, the seal contact surface of the gland eventually comes into contact with the seal, and upon further cranking in that same direction, pressure is applied to the seal so as to provide a tighter seal. The gland can be cranked to the point where the exact desired seal tightness is achieved. In the case where the seal comprises a pair of annular members and packing between the first and second annular members, as discussed above, when the gland is cranked in the direction such that the gland moves toward the seal, eventually, the seal contact surface of the gland comes into contact with one of the annular members, and upon further cranking in that direction, the seal contact surface of the gland pushes that annular member toward the other annular member, thereby squeezing the packing between the two annular members and increasing the tightness of the packing. The gland can be cranked to the point where the exact desired seal tightness is achieved.

In assembling such a valve, preferably the gland is cranked to the desired degree, then one or more shims are positioned adjacent the gland, and then the protuberance is positioned so that the shims are sandwiched between the gland and the protuberance. Alternatively, after the gland is cranked to the desired degree, one or more shims are positioned between the gland and the protuberance (the protuberance having already been positioned on the valve stem or having been integrally formed on the valve stem). Preferably, the number of glands and their respective dimensions are selected such that there is a relatively tight fit.

FIG. 3 depicts an example of a preferred embodiment according to the present invention. In this embodiment, the valve body includes a first portion 10, a second portion 11 and a third portion 12, each made of 316 stainless steel. The first portion 10 and the second portion 11 are connected to one another by a plurality of bolts 14 which are received in bores 15 formed in the first portion 10 and threaded into threaded regions 16 formed in the second portion 11.

A first gasket 13 is positioned between the second portion 11 and the third portion 12, and the second portion 11 and third portion 12 are connected to each other, with the first gasket 13 positioned therebetween, by bolts 17 which are received in bores (not shown) formed in the second portion 11 and threaded into threaded regions (not shown) formed in the third portion 12.

The third portion 12 of the valve body has a flow channel 20 in the form of a cylindrical bore extending therethrough.

A valve stem comprises a cranking portion 22, a cylindrical portion 23, a shoulder portion 24 and a translator engagement portion 25, all of which are integral with one another (e.g., in the form of a structure including the cranking portion 22 and cylindrical portion 23 which has been welded to a structure including the shoulder portion 24 and the translator engagement portion 25). The cylindrical portion 23, the shoulder portion 24 and the translator engagement portion 25 are positioned within the valve body, and the cranking portion 22 extends outside of the valve body. The valve stem is made of 316 stainless steel. A snap ring 26 is positioned within a circumferential groove formed in the valve stem, the snap ring functioning as the protuberance according to the present invention. The shoulder portion 24 functions as the protrusion according to the present invention, abutting a shoulder receiving portion 21 of the second portion 11 of the valve body, which limits axial movement upward (in the perspective depicted in FIG. 3) by the valve stem.

A translator comprises a translator stem 27 and a flow modulating region 28 welded to the translator stem 27. Both the translator stem 27 and the flow modulating region 28 are formed of 316 stainless steel. The translator stem 27 includes external threads which are threaded with internal threads positioned in the valve stem, such that upon rotation of the valve stem about its axis, the translator moves up or down (depending on the direction of rotation of the valve stem).

Figure 4:
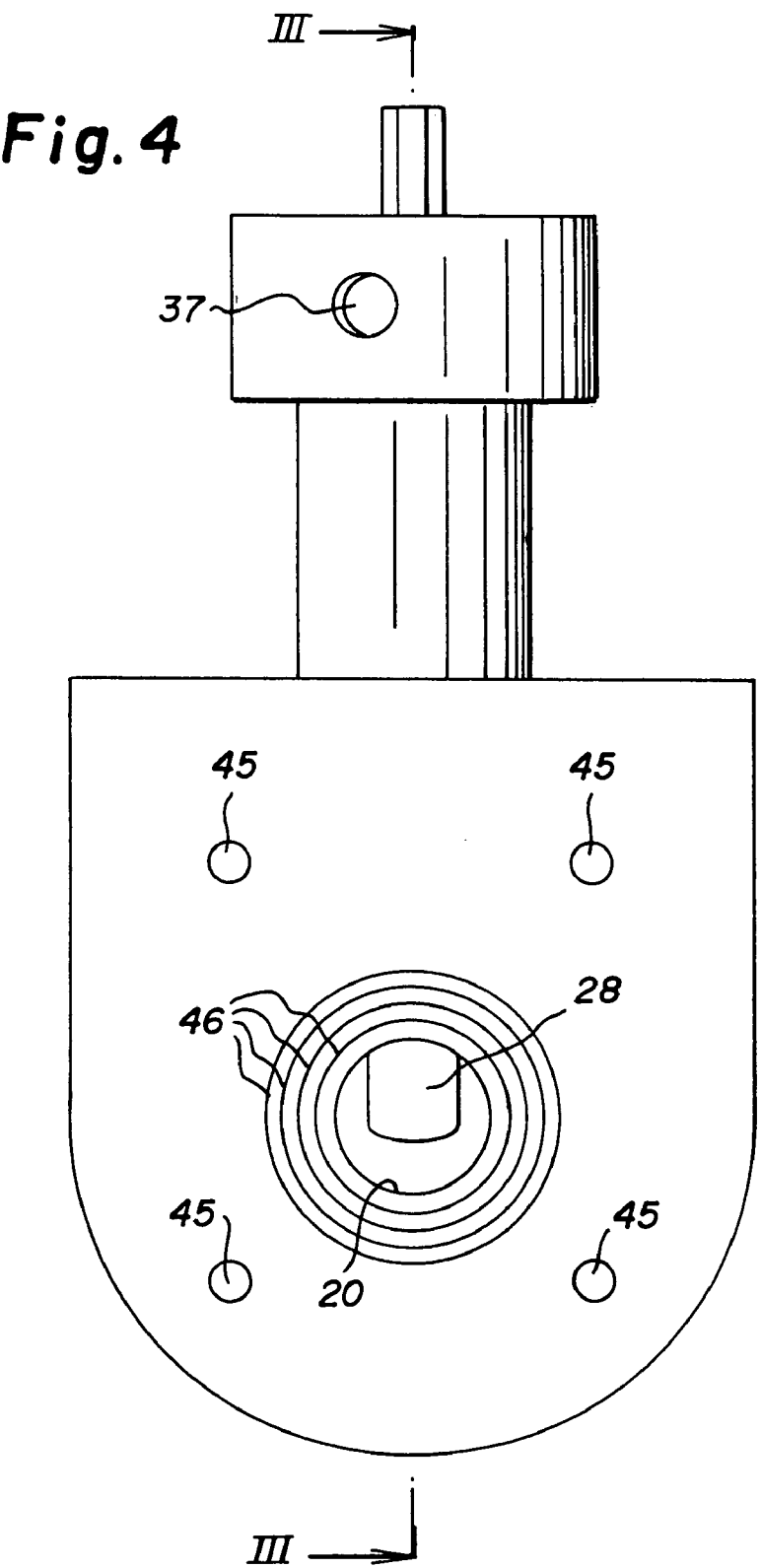
FIG. 4 is a front view of the valve depicted in FIG. 3.

FIG. 4 is a front view of the embodiment depicted in FIG. 3, the relationship between FIGS. 3 and 4 being that the view of FIG. 3 is a section along the line III—III shown in FIG. 4. Referring to FIG. 4, the flow channel 20 has a circular flow channel inlet, within which a portion of the flow modulating region 28 of the translator is evident in FIG. 4. Upon rotation of the valve stem, by virtue of its threaded connection to the translator, the flow modulating region 28 moves up or down from the perspective shown in FIG. 4, thereby altering the extent of interference in the flow channel 20 created by the flow modulating region 28.

Figure 5:
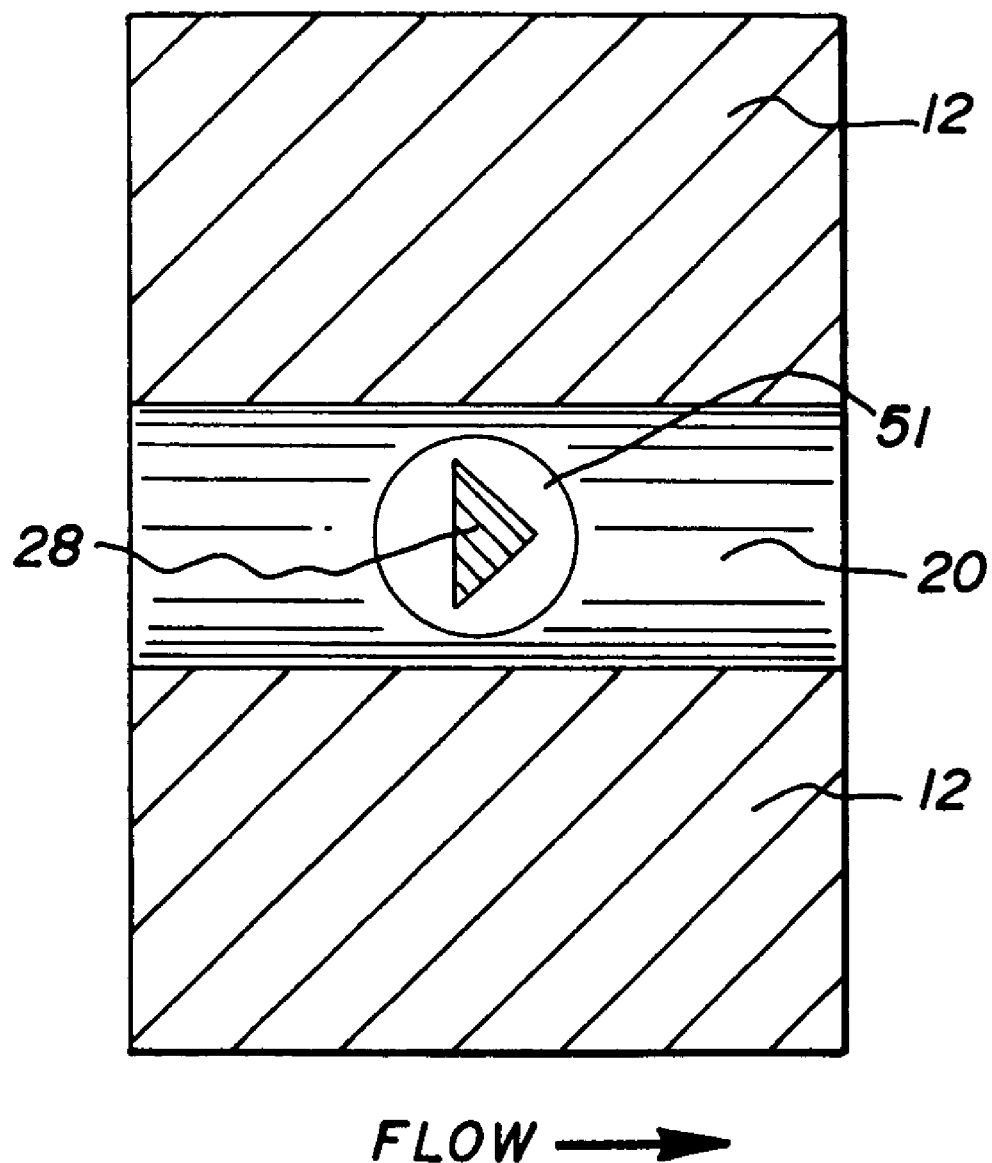
FIG. 5 is a cross-sectional view along the line V—V in FIG. 3.

FIG. 5 is a cross-sectional view along the line V—V in FIG. 3. As can be seen from FIG. 5, the cross-sectional shape of the flow modulating region 28 is triangular, with a flat side facing upstream and the apex on the downstream side thereof (i.e., fluid flowing through the flow channel 20 moves from left to right in FIG. 5, first reaching a flat surface, moving around the flat surface and then passing the apex on the backside of the flow modulating region 28.

Figure 8:
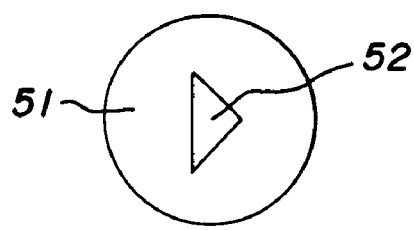
FIG. 8 shows a guide 51 of the valve depicted in FIGS. 3–6 separate from the valve.

Referring again to FIG. 3, a guide 51 is provided which prevents the translator from rotating. Referring to FIG. 8, which shows the guide 51 separate from the valve, the guide 51 has a guide opening 52 which has a non-cylindrical shape. In this embodiment, the shape of the guide opening is a polyhedron having a triangular cross-section which is slightly larger than the cross-section of the portion of the translator 28 which engages the guide.

Referring again to FIG. 3, a gland 29 is positioned radially between the valve stem and the second portion 11 of the valve body. The gland 29 has external threads which engage internal threads on the second portion 11 of the valve body. The gland 29 includes a gland cranking structure 30 on one end and a contact surface 31 on an opposite end. The gland cranking structure 30 can be engaged by a manual or automatic crank so as to rotate the gland about its axis. By virtue of the threads on the gland 29 engaging the threads on the second portion 11 of the valve body, upon rotation of the gland 29 in one direction, the gland moves upward in the perspective shown in FIG. 3, and upon rotation of the gland 29 about its axis in the opposite direction, the gland 29 moves downward in the perspective shown in FIG. 3.

Positioned below the gland 29 in the perspective shown in FIG. 3 are a first annular member 32, an annular packing structure 33 and a second annular ring 34. The second annular ring 34 is in contact with the annular packing structure 33 on one side, and the second portion 11 of the valve body on the other side. Upon cranking the gland 29 to a sufficient degree in the direction which causes the gland 29 to move downward in the perspective shown in FIG. 3, the contact surface 31 of the gland 29 comes into contact with the first annular ring 32, and upon further cranking of the gland in this direction, the gland 29 applies pressure to the first annular member 32 toward the second annular member 34, thereby compressing the packing 33 and thereby increasing the tightness of the seal created by the packing 33 between the valve stem and the second portion 11 of the valve body. Accordingly, the gland 29 can be cranked to the desired degree in order to achieve a desired tightness of the packing 33 for the particular application to which the valve is to be applied.

Figure 9:
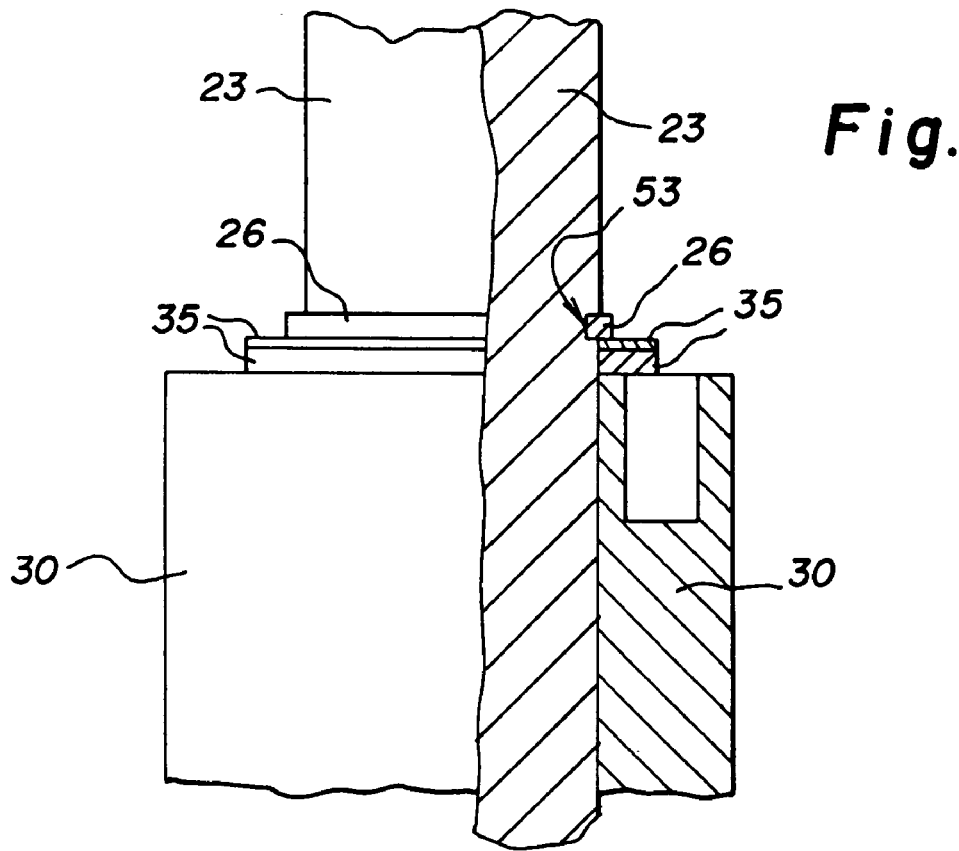
FIG. 9 is a partial sectional view showing a portion of the valve depicted in FIGS. 3–6 in more detail.

After cranking the gland 29 to the desired degree, one or more annular shims 35 can be placed over the valve stem and then the snap ring 26 put in place on the groove. Alternatively, the snap ring 26 is placed on the groove and then one or more shims 35 (e.g., each shim can be a pair of half rings) are inserted between the upper end of the gland cranking structure 30 and the snap ring 26. In the embodiment depicted in FIG. 3, two shims 35 are provided. FIG. 9 is a partial sectional view showing the snap ring 26, the two shims 35 and the upper end of the gland cranking structure 30 in more detail, as well as showing a groove 53 in the cylindrical portion 23 of the valve stem. By providing such shim or shims, the valve stem is secured in place (apart from being axially rotatable) relative to the valve body by the lowermost shim 35 contacting the upper end of the gland cranking structure 30 (thereby preventing the valve stem from moving farther downwardly) and the shoulder portion 24 engaging the shoulder receiving portion 21 of the second portion 11 of the valve body, thereby preventing the valve stem from moving upwardly relative to the valve body. In addition, the shims are effective to prevent the packing gland from unscrewing, and as a result, the desired pressure on the packing 33 can be reliably maintained.

FIG. 3 also depicts a plurality of bearings 36 positioned between the first portion 10 of the valve body and the valve stem.

FIG. 4 depicts a leak path hole 37 which communicates with an interior space 38 (see FIG. 3) defined between the first portion 10 and the second portion 11 of the valve body. Any fluid which passes through the packing 33 between the valve stem and the second portion 11 of the valve body tends to collect in the inner portion 38 and flow out of the valve through the leak path hole 37, where it can be readily collected.

Figure 6:
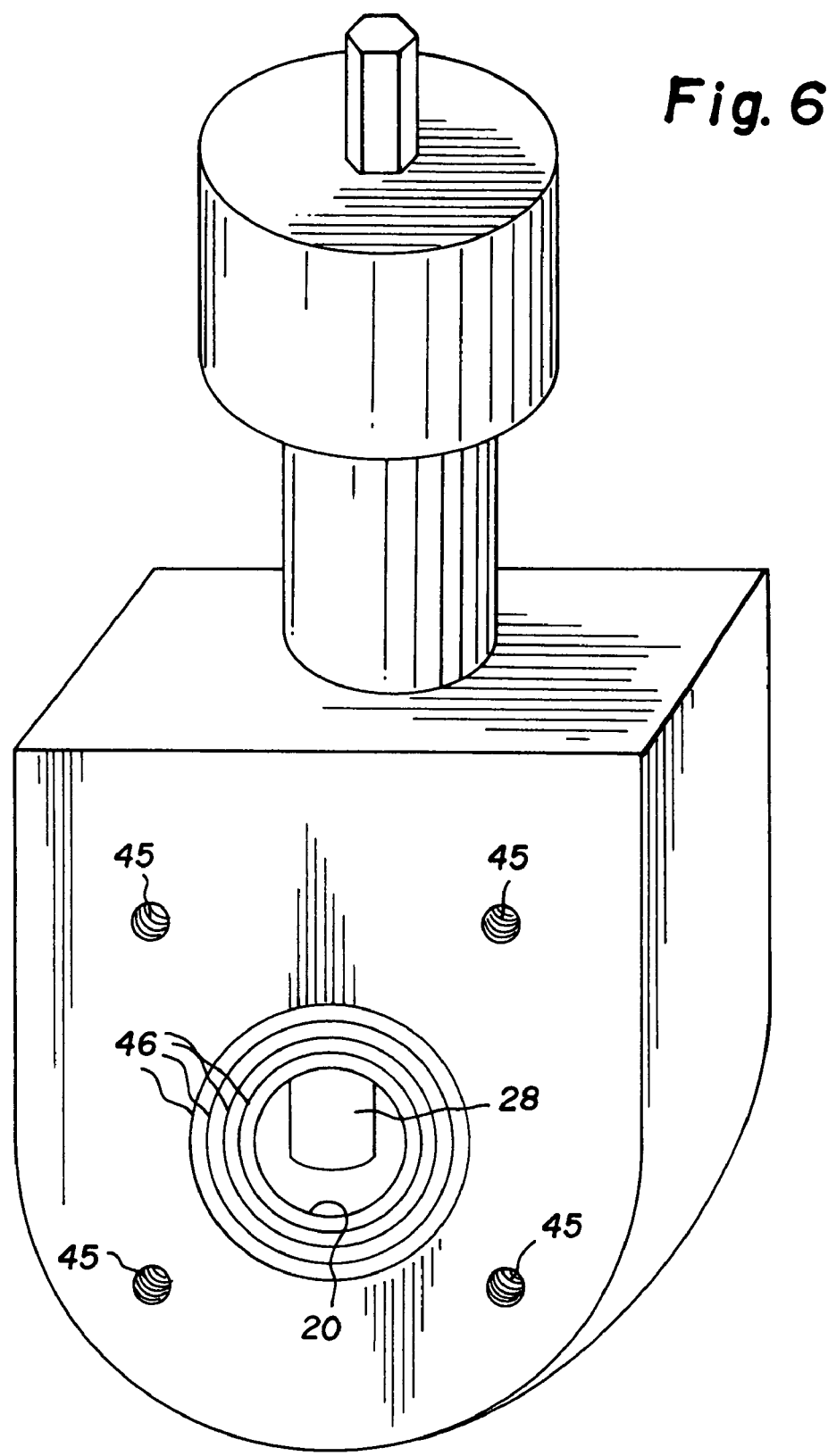
FIG. 6 is a perspective view of the valve depicted in FIGS. 3–5.

FIG. 6 is a perspective view of the valve depicted in FIGS. 3–5.

Although the embodiment of a valve depicted in FIGS. 2–6 is in a particular orientation, and directional references are made herein based on that orientation (e.g., the translator moves "up" and "down" relative to the valve body), the valve depicted in FIGS. 2–6, and in general the valves according to the present invention, can be oriented in any desired way.

Figure 7:
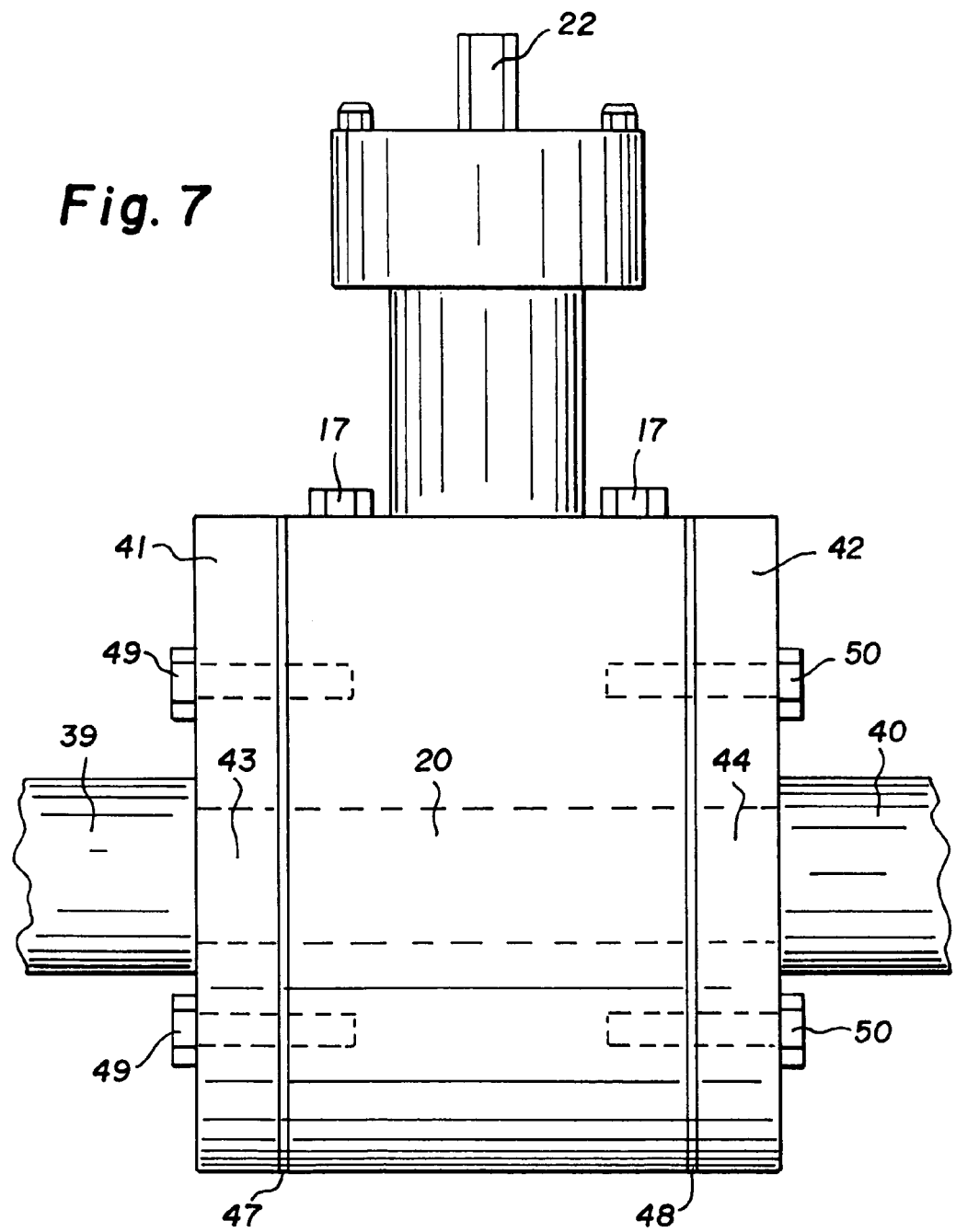
FIG. 7 depicts connection of the valve depicted in FIGS. 3–6 within a flow path between a first flanged pipe and a second flanged pipe.

FIG. 7 depicts connection of the valve depicted in FIGS. 3–6 within a flow path between a first pipe 39 and a second pipe 40. The first pipe 39 comprises an integral first flange 41, and the second pipe 40 comprises an integral second flange 42. The first flange 41 includes a first flow path 43, and the second flange 42 includes a second flow path 44. The flow channel 20 of the valve communicates with the first pipe 39 through the first flow path 43, and with the second pipe 40 through the second flow path 44, whereby fluid passes from the first pipe 39 through the valve and into the second pipe 40.

FIG. 4 shows a set of tapped holes 45 on the front face of the valve. A similar set of tapped holes (not shown) are formed on the rear face of the valve. Referring again to FIG. 7, the valve is attached to the first flange 41 with bolts 49 which pass through bores formed in the first flange 41 and which are threaded into the tapped holes 45. Similarly, the valve is attached to the second flange 42 with bolts 50 which pass through bores formed in the second flange 42 and which are threaded into the tapped holes on the rear face of the valve.

Positioned between the first flange 41 and the valve is a first gasket 47. Positioned between the second flange 42 and the valve is a second gasket 48.

FIG. 4 shows an inlet raised face surrounding the inlet to the flow channel 20, the raised face comprising concentric grooves 46 which engage the first gasket 47. Similarly, the valve includes an outlet raised face (not shown) surrounding the outlet from the flow channel 20, which engages the second gasket 48.

The present invention is further directed to a power generating system which comprises at least one turbine, and at least one combustion system comprising at least one fuel supply, at least one combustion canister, at least one valve as described herein, and at least one fuel conduit communicating between the fuel supply and the combustion canister through the flow channel in the valve. Turbines, fuel supplies and combustion canisters, as well as the connection of each of those elements and the relative orientation of those elements in a wide variety of arrangements are well known to those of skill in the art, and the present invention encompasses all such arrangement in general.

In a representative system, a main fuel line feeds fuel to respective inlets for primary, secondary and tertiary fuel lines within a skid. The primary, secondary and tertiary fuel lines supply fuel to a primary fuel manifold, a secondary fuel manifold and a tertiary fuel manifold, respectively. Each fuel manifold supplies fuel through a plurality of fuel lines, e.g., fourteen fuel lines per fuel manifold, and each fuel line communicates on an opposite end with a combustion canister (e.g., fourteen combustion canisters per manifold).

For each fuel manifold, the respective fuel lines are connected at different locations. Accordingly, the flow from the fuel supply to each of the respective combustion chambers is not identical, and therefore valves are provided in each of the fuel lines in order to modulate the flow of fuel in each of the respective fuel lines, making it possible to tune the overall system.

Any two or more structural parts of the valves described above can be integrated. Any structural part of the valves described above can be provided in two or more parts.

What is claimed is:

1. A valve comprising:
    a valve body having a bonnet receiving region and at least one flow channel; and
    a bonnet comprising a valve stem and a translator, at least a portion of said bonnet being positioned within said bonnet receiving region,
    said valve stem having a valve stem axis and being rotatable about said valve stem axis, said valve stem having valve stem threads on a valve stem threaded region,
    said translator having translator threads on a translator threaded region,
    said valve stem threads being threaded on said translator threads so that said translator can be moved from a first position to a second position by clockwise rotation of said valve stem about said valve stem axis, and said translator can be moved from said second position to said first position by counter-clockwise rotation of said valve stem about said valve stem axis, said first position being spaced from said second position in a translator motion direction which is co-linear with or substantially co-linear with said valve stem axis, at least a portion of said translator protruding into said flow channel when said translator is in at least one of said first position and said second position,
    whereby said translator can be positioned at a translator position selected from among said first position, said second position, or positions along said translator motion direction between said first position and said second position, such that flow through said flow channel is affected by said translator position,
    at least said translator threads having a coefficient of thermal expansion which is substantially similar to a coefficient of thermal expansion of said valve stem threads,
    said valve further comprising a gland and at least one shim, said gland being engaged with said valve body, said gland being positioned radially between said valve stem and said valve body, said valve stem having at least one protuberance extending radially outward from said valve stem, said shim being positioned axially between said protuberance and said gland, said shim thereby preventing said gland from moving axially beyond said shim.

2. A valve as recited in claim 1, wherein at least said translator threads and said valve stem threads are formed of the same material.

3. A valve as recited in claim 2, wherein at least said translator and said valve stem are formed of the same material.

4. A valve as recited in claim 1, further comprising a seal which prevents or inhibits fluid from said flow channel from escaping between said bonnet and said valve body.

5. A valve as recited in claim 4, wherein said seal comprises first and second annular members and packing, said first and second annular members being positioned radially between said valve stem and said valve body, said first and second annular members being substantially coaxial with said valve stem, said packing being positioned axially between said first and second annular members and radially between said valve stem and said valve body.

6. A valve as recited in claim 1, wherein said protuberance is a ring positioned in a circumferential groove formed in said valve stem.

7. A valve as recited in claim 1, wherein said valve stem further comprises at least one shoulder portion which extends radially from said valve stem axis farther than an adjacent portion of said valve stem, said valve stem being limited from moving in a first direction axially along said valve stem axis by said shoulder portion engaging a shoulder receiving portion of said valve body.

8. A valve comprising:
    a valve body having a bonnet receiving region and at least one flow channel;
    a bonnet comprising a valve stem and a translator, at least a portion of said bonnet being positioned within said bonnet receiving region, said valve stem having a valve stem axis and being rotatable about said valve stem axis, said valve stem having at least one protuberance extending radially outward from said valve stem;
    at least one protrusion being provided on one of said valve stem and said valve body, which protrusion engages the other of said valve stem and said valve body so as to limit axial movement of said valve stem relative to said valve body in a first direction along said valve stem axis;
    at least one gland engaged with said valve body, said gland being positioned radially outward from a portion of said valve stem; and
    at least one shim positioned radially between said valve stem and said valve body, and axially between said protuberance and said gland, so as to limit axial movement of said valve stem relative to said valve body in a second direction, opposite to said first direction,
    said valve stem having valve stem threads on a valve stem threaded region,
    said translator having translator threads on a translator threaded region,
    said valve stem threads being threaded on said translator threads so that said translator can be moved from a first position to a second position by clockwise rotation of said valve stem about said valve stem axis, and said translator can be moved from said second position to said first position by counter-clockwise rotation of said valve stem about said valve stem axis, said first position being spaced from said second position in a translator motion direction which is co-linear with or substantially co-linear with said valve stem axis, at least a portion of said translator protruding into said flow channel when said translator is in at least one of said first position and said second position, whereby said translator can be positioned at a translator position selected from among said first position, said second position, or positions along said translator motion direction between said first position and said second position, such that flow through said flow channel is affected by said translator position.

9. A valve as recited in claim 8, further comprising a seal which prevents or inhibits fluid from said flow channel from escaping between said bonnet and said valve body.

10. A valve as recited in claim 9, wherein said seal comprises first and second annular members and packing, said first and second annular members being positioned radially between said valve stem and said valve body, said first and second annular members being substantially coaxial with said valve stem, said packing being positioned axially between said first and second annular members and radially between said valve stem and said valve body.

11. A valve as recited in claim 8, wherein said protuberance is a ring positioned in a circumferential groove formed in said valve stem.

12. A valve as recited in claim 8, wherein said gland has external gland threads which are threaded on internal gland threads on said valve body such that said gland can be selectively rotated clockwise or counter-clockwise relative to said valve stem axis to cause said gland to be moved axially relative to said valve stem axis.

13. A valve as recited in claim 8, wherein said at least one protrusion comprises a shoulder portion on said valve stem, said shoulder portion extending radially from said valve stem axis farther than an adjacent portion of said valve stem, said valve stem being limited from moving in said first direction axially along said valve stem axis by said shoulder portion engaging a shoulder receiving portion of said valve body.

14. A power generating system, comprising:
at least one turbine; and
at least one combustion system, said combustion system comprising:
  at least one fuel supply;
  at least one combustion canister;
  at least one valve, said valve comprising:
    a valve body having a bonnet receiving region and at least one flow channel; and
    a bonnet comprising a valve stem and a translator, at least a portion of said bonnet being positioned within said bonnet receiving region; and
  at least one fuel conduit communicating between said fuel supply and said combustion canister through said flow channel,
said valve stem having a valve stem axis and being rotatable about said valve stem axis, said valve stem having valve stem threads on a valve stem threaded region,
said translator having translator threads on a translator threaded region,
said valve stem threads being threaded on said translator threads so that said translator can be moved from a first position to a second position by clockwise rotation of said valve stem about said valve stem axis, and said translator can be moved from said second position to said first position by counter-clockwise rotation of said valve stem about said valve stem axis, said first position being spaced from said second position in a translator motion direction which is co-linear with or substantially co-linear with said valve stem axis, at least a portion of said translator protruding into said flow channel when said translator is in at least one of said first position and said second position,
whereby said translator can be positioned at a translator position selected from among said first position, said second position, or positions along said translator motion direction between said first position and said second position, such that flow through said flow channel is affected by said translator position,
at least said translator threads having a coefficient of thermal expansion which is substantially similar to a coefficient of thermal expansion of said valve stem threads,
said power generating system further comprising a gland and at least one shim, said gland being engaged with said valve body, said gland being positioned radially between said valve stem and said valve body, said valve stem having at least one protuberance extending radially outward from said valve stem, said shim being positioned axially between said protuberance and said gland, said shim thereby preventing said gland from moving axially beyond said shim.

15. A power generating system as recited in claim 14, wherein at least said translator threads and said valve stem threads are formed of the same material.

16. A power generating system as recited in claim 15, wherein at least said translator and said valve stem are formed of the same material.

17. A power generating system as recited in claim 14, further comprising a seal which prevents or inhibits fluid from said flow channel from escaping between said bonnet and said valve body.

18. A power generating system as recited in claim 17, wherein said seal comprises first and second annular members and packing, said first and second annular members being positioned radially between said valve stem and said valve body, said first and second annular members being substantially coaxial with said valve stem, said packing being positioned axially between said first and second annular members and radially between said valve stem and said valve body.

19. A power generating system as recited in claim 14, wherein said protuberance is a ring positioned in a circumferential groove formed in said valve stem.

20. A power generating system as recited in claim 14, wherein said valve stem further comprises at least one shoulder portion which extends radially from said valve stem axis farther than an adjacent portion of said valve stem, said valve stem being limited from moving in a first direction axially along said valve stem axis by said shoulder portion engaging a shoulder receiving portion of said valve body.

21. A power generating system, comprising:
at least one turbine; and
at least one combustion system, said combustion system comprising:
  at least one fuel supply;
  at least one combustion canister;
  at least one valve, said valve comprising:
    a valve body having a bonnet receiving region and at least one flow channel;
      a bonnet comprising a valve stem and a translator, at least a portion of said bonnet being positioned within said bonnet receiving region, said valve stem having a valve stem axis and being rotatable about said valve stem axis, said valve stem having at least one protuberance extending radially outward from said valve stem;

at least one protrusion being provided on one of said valve stem and said valve body, which protrusion engages the other of said valve stem and said valve body so as to limit axial movement of said valve stem relative to said valve body in a first direction along said valve stem axis;

at least one gland engaged with said valve body, said gland being positioned radially outward from at least a portion of said valve stem; and at least one shim positioned radially outward from said valve stem and axially between said protuberance and said gland, so as to limit axial movement of said valve stem relative to said valve body in a second direction, opposite to said first direction; and at least one fuel conduit communicating between said fuel supply and said combustion canister through said flow channel, said valve stem having valve stem threads on a valve stem threaded region, said translator having translator threads on a translator threaded region, said valve stem threads being threaded on said translator threads so that said translator can be moved from a first position to a second position by clockwise rotation of said valve stem about said valve stem axis, and said translator can be moved from said second position to said first position by counter-clockwise rotation of said valve stem about said valve stem axis, said first position being spaced from said second position in a translator motion direction which is co-linear with or substantially co-linear with said valve stem axis, at least a portion of said translator protruding into said flow channel when said translator is in at least one of said first position and said second position, whereby said translator can be positioned at a translator position selected from among said first position, said second position, or positions along said translator motion direction between said first position and said second position, such that flow through said flow channel is affected by said translator position.

22. A power generating system as recited in claim 21, further comprising a seal which prevents or inhibits fluid from said flow channel from escaping between said bonnet and said valve body.

23. A power generating system as recited in claim 22, wherein said seal comprises first and second annular members and packing, said first and second annular members being positioned radially between said valve stem and said valve body, said first and second annular members being substantially coaxial with said valve stem, said packing being positioned axially between said first and second annular members and radially between said valve stem and said valve body.

24. A power generating system as recited in claim 21, wherein said protuberance is a ring positioned in a circumferential groove formed in said valve stem.

25. A power generating system as recited in claim 21, wherein said gland has external gland threads which are threaded on internal gland threads on said valve body such the said gland can be selectively rotated clockwise or counter-clockwise relative to said valve stem axis to cause said gland to be moved axially relative to said valve stem axis.

26. A power generating system as recited in claim 21, wherein said at least one protrusion comprises a shoulder portion on said valve stem, said shoulder portion extending radially from said valve stem axis farther than an adjacent portion of said valve stem, said valve stem being limited from moving in said first direction axially along said valve stem axis by said shoulder portion engaging a shoulder receiving portion of said valve body.

27. A valve comprising:

a valve body having a bonnet receiving region and at least one flow channel;

a bonnet comprising a valve stem and a translator, at least a portion of said bonnet being positioned within said bonnet receiving region, said valve stem having a valve stem axis and being rotatable about said valve stem axis;

first and second annular members, said first and second annular members being positioned radially between said valve stem and said valve body, said first and second annular members being substantially coaxial with said valve stem;

packing positioned axially between said first and second annular members and radially between said valve stem and said valve body; and a gland positioned radially between said valve stem and said valve body, said gland having external gland threads which are threaded on internal gland threads on said valve body such that said gland can be selectively rotated clockwise or counter-clockwise relative to said valve stem axis to cause said gland to be moved axially relative to said valve stem axis selectively to increase or decrease a distance between said first and second annular members and thereby selectively decrease or increase pressure applied to said packing, at least one protrusion being provided on one of said valve stem and said valve body, which protrusion engages the other of said valve stem and said valve body so as to limit axial movement of said valve stem relative to said valve body along said valve stem axis, said valve stem having valve stem threads on a valve stem threaded region, said translator having translator threads on a translator threaded region, said valve stem threads being threaded on said translator threads so that said translator can be moved from a first position to a second position by clockwise rotation of said valve stem about said valve stem axis, and said translator can be moved from said second position to said first position by counter-clockwise rotation of said valve stem about said valve stem axis, said first position being spaced from said second position in a translator motion direction which is co-linear with or substantially co-linear with said valve stem axis, at least a portion of said translator protruding into said flow channel when said translator is in at least one of said first position and said second position, whereby said translator can be positioned at a translator position selected from among said first position, said second position, or positions along said translator motion direction between said first position and said second position, such that flow through said flow channel is affected by said translator position, at least said translator threads having a coefficient of thermal expansion which is substantially similar to a coefficient of thermal expansion of said valve stem threads.

28. A valve as recited in claim 27, wherein at least said translator threads and said valve stem threads are formed of the same material.

29. A valve as recited in claim 28, wherein at least said translator and said valve stem are formed of the same material.

30. A valve as recited in claim 27, further comprising at least one shim, said valve stem having at least one protuberance extending radially outward from said valve stem, said shim being positioned axially between said protuberance and said gland, said shim thereby preventing said gland from moving axially beyond said shim.

31. A valve as recited in claim 30, wherein said protuberance is a ring positioned in a circumferential groove formed in said valve stem.

32. A valve as recited in claim 27, wherein said at least one protrusion comprises a shoulder portion on said valve stem, said shoulder portion extending radially from said valve stem axis farther than an adjacent portion of said valve stem, said valve stem being limited from moving in said first direction axially along said valve stem axis by said shoulder portion engaging a shoulder receiving portion of said valve body.

33. A valve comprising:
a valve body having a bonnet receiving region and at least one flow channel;
a bonnet comprising a valve stem and a translator, at least a portion of said bonnet being positioned within said bonnet receiving region, said valve stem having a valve stem axis and being rotatable about said valve stem axis, said valve stem having at least one protuberance extending radially outward from said valve stem;
at least one protrusion being provided on one of said valve stem and said valve body, which protrusion engages the other of said valve stem and said valve body so as to limit axial movement of said valve stem relative to said valve body in a first direction along said valve stem axis;
first and second annular members, said first and second annular members being positioned radially between said valve stem and said valve body, said first and second annular members being substantially coaxial with said valve stem;
packing positioned axially between said first and second annular members and radially between said valve stem and said valve body;
at least one gland positioned radially between said valve stem and said valve body, said packing gland having external gland threads which are threaded on internal gland threads on said valve body such that said packing gland can be selectively rotated clockwise or counter-clockwise relative to said valve stem axis to cause said packing gland to be moved axially relative to said valve body along said valve stem axis selectively to increase or decrease a distance between said first and second annular members and thereby selectively decrease or increase pressure applied to said packing; and
at least one shim positioned radially between said valve stem and said valve body, and axially between said protuberance and said gland, so as to limit axial movement of said valve stem relative to said valve body in a second direction, opposite to said first direction,
said valve stem having valve stem threads on a valve stem threaded region,
said translator having translator threads on a translator threaded region,
said valve stem threads being threaded on said translator threads so that said translator can be moved from a first position to a second position by clockwise rotation of said valve stem about said valve stem axis, and said translator can be moved from said second position to said first position by counter-clockwise rotation of said valve stem about said valve stem axis, said first position being spaced from said second position in a translator motion direction which is co-linear with or substantially co-linear with said valve stem axis, at least a portion of said translator protruding into said flow channel when said translator is in at least one of said first position and said second position,
whereby said translator can be positioned at a translator position selected from among said first position, said second position, or positions along said translator motion direction between said first position and said second position, such that flow through said flow channel is affected by said translator position.

34. A valve as recited in claim 33, wherein said protuberance is a ring positioned in a circumferential groove formed in said valve stem.

35. A valve as recited in claim 33, wherein said at least one protrusion comprises a shoulder element attached to an end of said valve stem, said shoulder element comprising at least one shoulder portion which extends radially from said valve stem axis farther than an adjacent portion of said valve stem, said valve stem being limited from moving in said first direction axially along said valve stem axis by said shoulder portion engaging a shoulder receiving portion of said valve body.

36. A power generating system, comprising:
at least one turbine; and
at least one combustion system, said combustion system comprising:
at least one fuel supply;
at least one combustion canister;
at least one valve, said valve comprising:
a valve body having a bonnet receiving region and at least one flow channel;
a bonnet comprising a valve stem and a translator, at least a portion of said bonnet being positioned within said bonnet receiving region, said valve stem having a valve stem axis and being rotatable about said valve stem axis;
first and second annular members, said first and second annular members being positioned radially between said valve stem and said valve body, said first and second annular members being substantially coaxial with said valve stem;
packing positioned axially between said first and second annular members and radially between said valve stem and said valve body; and
a gland positioned radially between said valve stem and said valve body, said gland having external gland threads which are threaded on internal gland threads on said valve body such that said gland can be selectively rotated clockwise or counter-clockwise relative to said valve stem axis to cause said gland to be moved axially relative to said valve stem axis selectively to increase or decrease a distance between said first and second annular members and thereby selectively decrease or increase pressure applied to said packing; and
at least one fuel conduit communicating between said fuel supply and said combustion canister through said flow channel,
at least one protrusion being provided on one of said valve stem and said valve body, which protrusion engages the other of said valve stem and said valve body so as to limit axial movement of said valve stem relative to said valve body along said valve stem axis, said valve stem having valve stem threads on a valve stem threaded region, said translator having translator threads on a translator threaded region, said valve stem threads being threaded on said translator threads so that said translator can be moved from a first position to a second position by clockwise rotation of said valve stem about said valve stem axis, and said translator can be moved from said second position to said first position by counter-clockwise rotation of said valve stem about said valve stem axis, said first position being spaced from said second position in a translator motion direction which is co-linear with or substantially co-linear with said valve stem axis, at least a portion of said translator protruding into said flow channel when said translator is in at least one of said first position and said second position, whereby said translator can be positioned at a translator position selected from among said first position, said second position, or positions along said translator motion direction between said first position and said second position, such that flow through said flow channel is affected by said translator position, at least said translator threads having a coefficient of thermal expansion which is substantially similar to a coefficient of thermal expansion of said valve stem threads.

37. A power generating system as recited in claim 36, wherein at least said translator threads and said valve stem threads are formed of the same material.

38. A power generating system as recited in claim 37, wherein at least said translator and said valve stem are formed of the same material.

39. A power generating system as recited in claim 36, further comprising at least one shim, said valve stem having at least one protuberance extending radially outward from said valve stem, said shim being positioned axially between said protuberance and said gland, said shim thereby preventing said gland from moving axially beyond said shim.

40. A power generating system as recited in claim 39, wherein said protuberance is a ring positioned in a circumferential groove formed in said valve stem.

41. A power generating system as recited in claim 36, wherein said at least one protrusion comprises a shoulder portion on said valve stem, said shoulder portion extending radially from said valve stem axis farther than an adjacent portion of said valve stem, said valve stem being limited from moving in said first direction axially along said valve stem axis by said shoulder portion engaging a shoulder receiving portion of said valve body.

42. A power generating system, comprising:
at least one turbine; and
at least one combustion system, said combustion system comprising:
  at least one fuel supply;
  at least one combustion canister;
  at least one valve, said valve comprising:
    a valve body having a bonnet receiving region and at least one flow channel;
    a bonnet comprising a valve stem and a translator, at least a portion of said bonnet being positioned within said bonnet receiving region, said valve stem having a valve stem axis and being rotatable about said valve stem axis, said valve stem having at least one protuberance extending radially outward from said valve stem;
    at least one protrusion being provided on one of said valve stem and said valve body, which protrusion engages the other of said valve stem and said valve body so as to limit axial movement of said valve stem relative to said valve body in a first direction along said valve stem axis;
    first and second annular members, said first and second annular members being positioned radially between said valve stem and said valve body, said first and second annular members being substantially coaxial with said valve stem;
    packing positioned axially between said first and second annular members and radially between said valve stem and said valve body;
    at least one gland positioned radially between said valve stem and said valve body, said packing gland having external gland threads which are threaded on internal gland threads on said valve body such that said packing gland can be selectively rotated clockwise or counter-clockwise relative to said valve stem axis to cause said packing gland to be moved axially relative to said valve body along said valve stem axis selectively to increase or decrease a distance between said first and second annular members and thereby selectively decrease or increase pressure applied to said packing; and
    at least one shim positioned radially between said valve stem and said valve body, and axially between said protuberance and said gland, so as to limit axial movement of said valve stem relative to said valve body in a second direction, opposite to said first direction; and
  at least one fuel conduit communicating between said fuel supply and said combustion canister through said flow channel, said valve stem having valve stem threads on a valve stem threaded region, said translator having translator threads on a translator threaded region, said valve stem threads being threaded on said translator threads so that said translator can be moved from a first position to a second position by clockwise rotation of said valve stem about said valve stem axis, and said translator can be moved from said second position to said first position by counter-clockwise rotation of said valve stem about said valve stem axis, said first position being spaced from said second position in a translator motion direction which is co-linear with or substantially co-linear with said valve stem axis, at least a portion of said translator protruding into said flow channel when said translator is in at least one of said first position and said second position, whereby said translator can be positioned at a translator position selected from among said first position, said second position, or positions along said translator motion direction between said first position and said second position, such that flow through said flow channel is affected by said translator position.

43. A power generating system as recited in claim 42, wherein said protuberance is a ring positioned in a circumferential groove formed in said valve stem.

44. A power generating system as recited in claim 42, wherein said at least one protrusion comprises a shoulder element attached to an end of said valve stem, said shoulder element comprising at least one shoulder portion which extends radially from said valve stem axis farther than an adjacent portion of said valve stem, said valve stem being limited from moving in said first direction axially along said valve stem axis by said shoulder portion engaging a shoulder receiving portion of said valve body.

45. A method of constructing a valve, comprising:

inserting at least one shim radially between a valve stem and a valve body, and axially between a protuberance and a gland, so as to limit axial movement of said valve stem relative to said valve body in a first direction along an axis of said valve stem, said valve body having a bonnet receiving region and at least one flow channel, said bonnet comprising said valve stem and a translator, at least a portion of said bonnet being positioned within said bonnet receiving region, said valve stem being rotatable about said axis, said protuberance extending radially outward from said valve stem, at least one protrusion being provided on one of said valve stem and said valve body, which protrusion engages the other of said valve stem and said valve body so as to limit axial movement of said valve stem relative to said valve body in a second direction, opposite to said first direction, said gland being engaged with said valve body and being positioned radially outward from a portion of said valve stem, said valve stem having valve stem threads on a valve stem threaded region, said translator having translator threads on a translator threaded region, said valve stem threads being threaded on said translator threads so that said translator can be moved from a first position to a second position by clockwise rotation of said valve stem about said valve stem axis, and said translator can be moved from said second position to said first position by counter-clockwise rotation of said valve stem about said valve stem axis, said first position being spaced from said second position in a translator motion direction which is co-linear with or substantially co-linear with said valve stem axis, at least a portion of said translator protruding into said flow channel when said translator is in at least one of said first position and said second position, whereby said translator can be positioned at a translator position selected from among said first position, said second position, or positions along said translator motion direction between said first position and said second position, such that flow through said flow channel is affected by said translator position.

* * * * *